Patented Dec. 3, 1940

2,223,903

UNITED STATES PATENT OFFICE 2,223,903

METHOD OF PRODUCING A PERBORATE OF LIGHT WEIGHT IN BULK

Eduard von Drathen and Alois Köthe, Coswig, Anhalt, Germany

No Drawing. Application October 19, 1938, Serial No. 235,860. In Germany June 7, 1937

4 Claims. (Cl. 23—60)

The production of sodium perborate normally takes place by the introduction of a stoichiometric quantity of sodium metaborate into a 3–30% peroxide of hydrogen, with or without agitation and with or without cooling. The resulting sodium perborate has normally a weight in bulk amounting to 650–750 grammes per litre. When proceeding in reverse fashion and allowing the 3 or 30% peroxide of hydrogen to flow into the sodium metaborate liquor, either with or without agitation, a sodium perborate is obtained which also has an average weight in bulk amounting to 650–750 grammes per litre.

Now the surprising discovery has been made that the weight in bulk of the sodium perborate is entirely dependent on the time within which the sodium metaborate liquor is added to the peroxide of hydrogen. It has also been found that this effect of the time in the case of a reverse process, i. e., when peroxide of hydrogen is added to the sodium metaborate liquor, does not take place, and that the weight in bulk then always remains the same.

If, for example, the peroxide of hydrogen is allowed to run into the sodium metaborate over a period of 4 hours, a weight in bulk is obtained amounting to 650–750 grammes per litre. If this time is reduced to one-quarter of an hour, the weight is again the same.

On the other hand the results are entirely different if the stoichiometric quantity of sodium metaborate liquor is added to the peroxide of hydrogen. In this case the weight in bulk is dependent to a large extent on the time taken in making the addition.

Thus, for example, a weight in bulk was found amounting upon addition of the metaborate Over ¼ of an hour to 650–750 grammes per litre,
Over ½ hour to 550–650 grammes per litre,
Over 1 hour to 450–550 grammes per litre,
Over 4 hours to 350–450 grammes per litre, and
Over 5 hours to 380–480 grammes per litre.

This discovery provides the unforeseen possibility of producing a sodium perborate, the weight in bulk of which amounts to practically one-half of that of the normal product. It has not been known, or successfully attempted, heretofore to produce a light product of this nature, which is of considerable interest in the art. It was also not to be foreseen that upon the addition of the sodium metaborate to the peroxide of hydrogen an effect of this kind would be brought about dependent on the time taken for the addition.

The liquid can be agitated. In many cases it is even of advantage to agitate the liquid gently, as in this way there is obtained a finer and more even grain of the light sodium perborate.

We claim:

1. A method of producing a sodium perborate of light weight in bulk, which consists in introducing a stoichiometric quantity of sodium metaborate solution into a 3–10% solution of peroxide of hydrogen over a period of 2 to 5 hours.

2. In a method as claimed in claim 1, the step which consists in agitating the liquid during the addition of the sodium metaborate solution.

3. A method of producing a sodium perborate of light weight in bulk, which consists in introducing a stoichiometric quantity of concentrated sodium metaborate solution into a 3–10% solution of peroxide of hydrogen over a period of 2 to 5 hours while agitating the liquid.

4. A method of producing a sodium perborate of light weight in bulk, which consists in introducing a stoichiometric quantity of diluted sodium metaborate solution into a 3–10% solution of peroxide of hydrogen over a period of 2 to 5 hours while agitating the liquid.

EDUARD v. DRATHEN.
ALOIS KÖTHE.